UNITED STATES PATENT OFFICE.

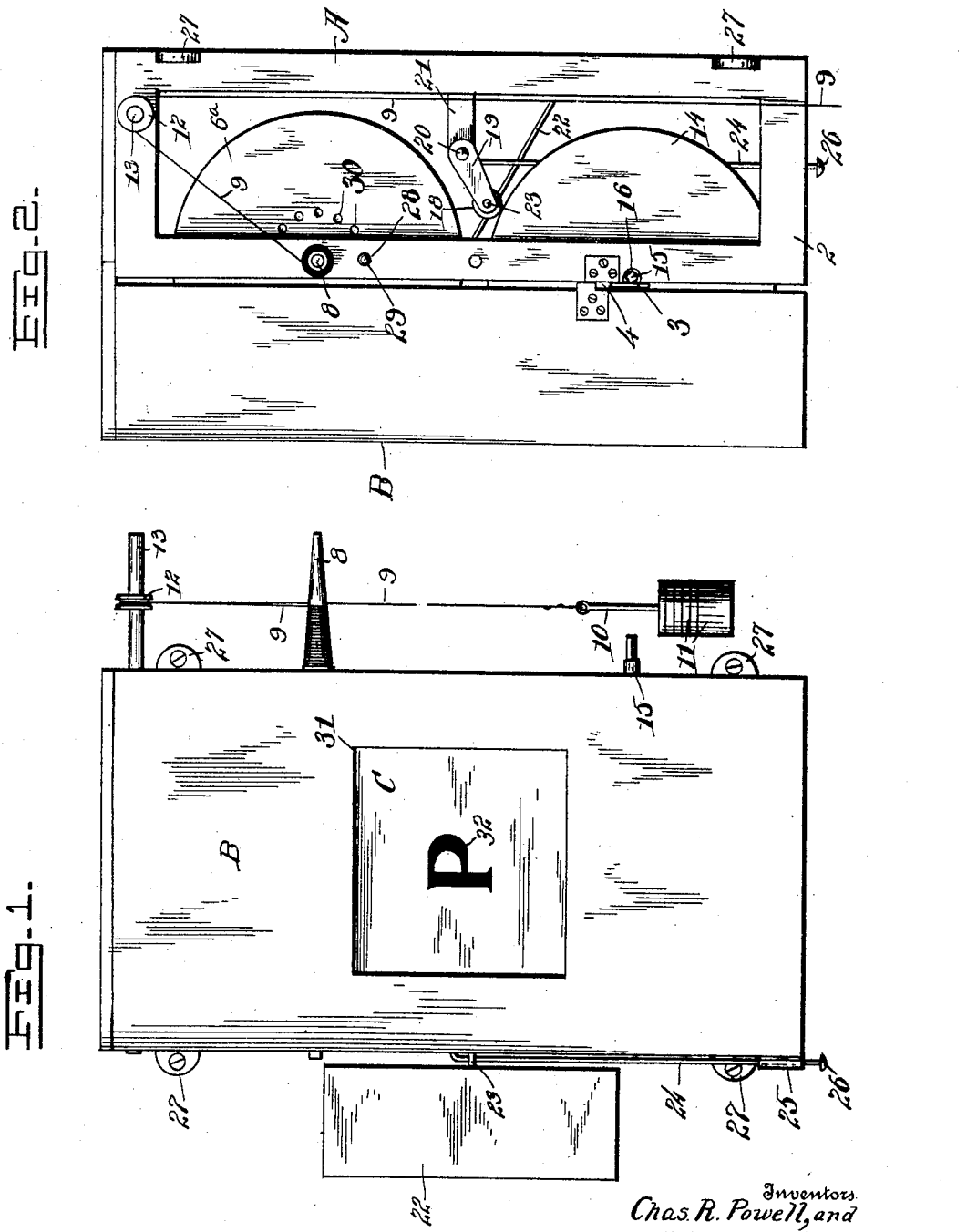

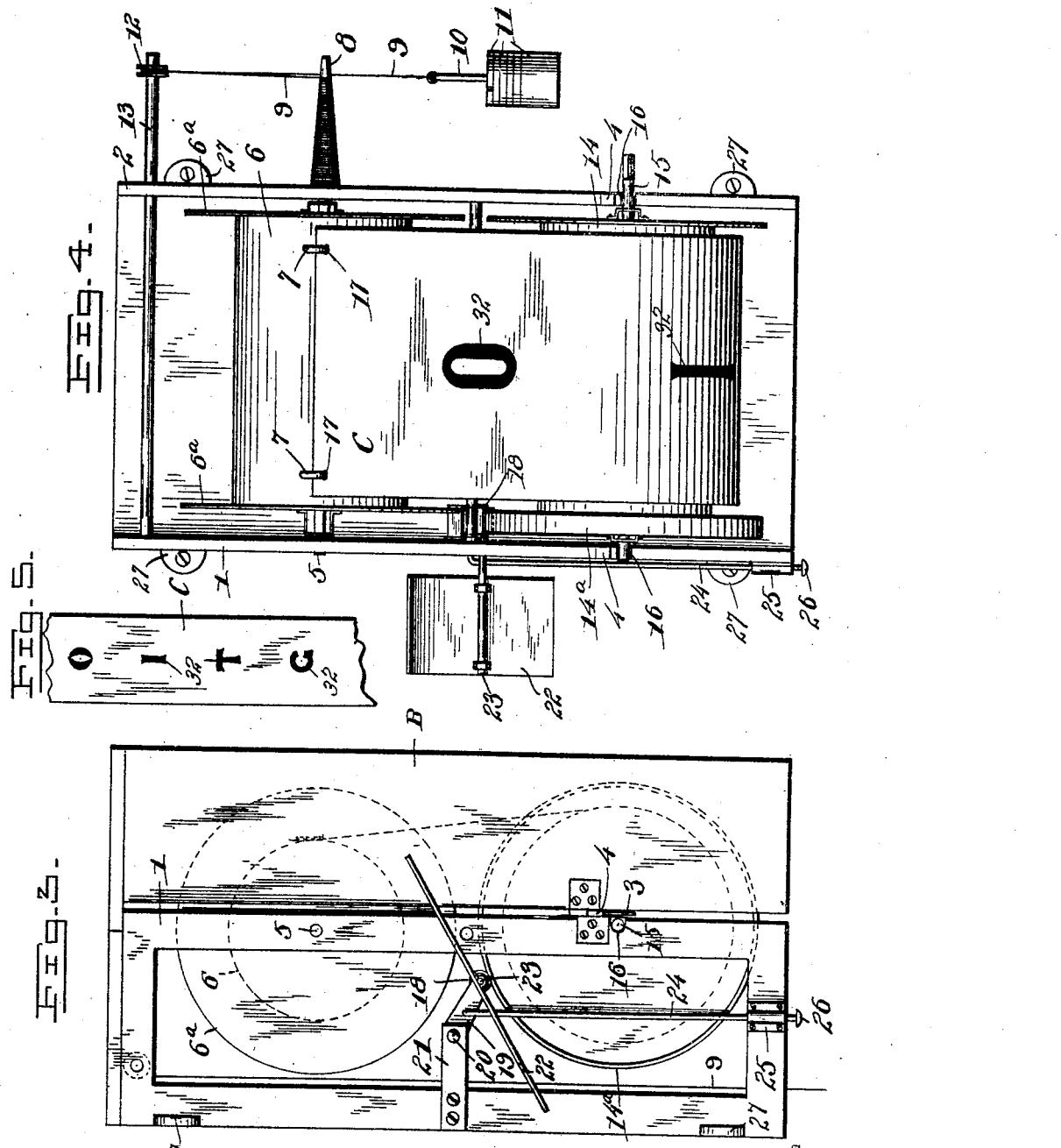

CHARLES R. POWELL AND WILLIAM BEVAN, OF SCRANTON, PENNSYLVANIA.

MACHINE FOR TEACHING TOUCH TYPE-WRITING.

No. 823,362.     Specification of Letters Patent.     Patented June 12, 1906.

Application filed July 21, 1905. Serial No. 270,713.

*To all whom it may concern:*

Be it known that we, CHARLES R. POWELL and WILLIAM BEVAN, citizens of the United States, residing at Scranton, in the county of Lackawanna and State of Pennsylvania, have invented certain new and useful Improvements in Machines for Teaching Touch Type-Writing, of which the following is a specification.

The purpose of our invention is to provide a machine adapted for teaching type-writing by what is commonly known as the "touch" method, wherein the operator acquires a familiarity with the relative arrangement of the keys on the keyboard of the type-writer and is enabled to operate the writing-machine without looking at the keyboard. The machine made according to our invention is especially adapted for teaching classes in schools, although it is of course suitable for individual instruction.

Our invention comprises a casing having an opening therein, lesson-strips having printed characters thereon, and means for moving the strip vertically past the opening in the casing, so as to bring the characters successively into view at uniform intervals of time. As the characters come successively into view the operator depresses the corresponding keys on the keyboard, and as the keys and the strip cannot both be watched at the same time the operator watches the strip and learns to operate the keys without looking at the keyboard. Means are provided for moving the strip at any desired speed, and by gradually increasing the speed of the lesson-strip as the pupil acquires familiarity with the keys the pupil gains speed on the writing-machine. The lesson-strips are provided with characters arranged in various orders, and the strips are arranged, by preference, to move vertically, as it is easier to follow the vertically-moving characters with the eye than if the characters moved horizontally.

In the accompanying drawings, which illustrate our invention, Figure 1 is a view showing the machine in front elevation. Figs. 2 and 3 are right and left side views of the same, respectively. Fig. 4 is a front elevation of the device with the cover removed; and Fig. 5 is a front view, on a reduced scale, of a portion of a lesson-strip.

Referring to the drawings, A indicates the frame of the machine, and B indicates a cover which is detachably secured to the sides 1 and 2 of the frame by means of pins 3, suitably connected to the cover and passing through eyes 4, which latter are attached to the front edges of the sides of the frame, as shown. A shaft 5 is journaled in the upper part of the frame, and upon this shaft is rigidly secured a winding spool or drum 6, having side flanges $6^a$ and suitable hooks 7 for the attachment of one end of a lesson-strip C. A tapering spindle or drum 8 is secured to one end of the shaft 5, and a cord 9 has one end secured to said spindle and its opposite end secured to a rod 10, upon which are arranged a suitable number of weights 11 to operate the machine at the desired speed. The cord 9 passes over a sheave 12, which is loosely mounted upon a rod 13, the latter being secured in the upper part of the casing and arranged parallel with the shaft 5. One end of the lesson-strip C is secured to a lesson-holding spool or drum 14, and said spool is secured to a shaft 15, the latter being arranged parallel with the shaft 5 and journaled within notches or recesses 16 in the forward edges of the machine-frame. The spool 14 is removable and its shaft is normally held within the notches or bearings by the pins or pintles 3, which connect the cover to the main frame. The arrangement is such that when the cover is removed by lifting it upward the pintles 3 will be moved out of line with the shaft 16 and the lesson-roller may be removed and another roller having another lesson thereon may be inserted.

There may be any desired number of lesson-holding rollers, each having a lesson-strip thereon, one end of the strip being secured to the roller, the opposite end of the strip being provided with perforations 17 for attachment to the hooks 7 upon the winding-roller. The lesson-strips, which are made of suitable flexible material, such as paper or cloth, have letters, numerals, punctuation-marks, &c., printed thereon, these printed characters being arranged singly at substantially equal distances apart longitudinally of the strip and of such size that they may be plainly read from a distance equal to the length of an ordinary school-room. One flange of the spool 14 is turned over, as shown at $14^a$, to form a flat ring or wheel upon which a retarding-roller 18 normally rests. This roller, as shown, is journaled in the free end of an arm 19, the opposite end of said arm being connected by a pivot 20 to a fixed part 21 upon the machine-frame. A fan 22 is secured to a spindle 23, upon which the roller 18 is also secured. The roller 18 is preferably made of rubber or provided with a rubber or other surface which will not slip upon the ring 14. A rod 24, connected to the arm 19, extends downward through a suitable bearing 25 upon the frame, and this rod is provided with a suitable knob 26 below the casing. By pressing the knob 26 upward the roller 18 may be lifted off of the flange or ring 14$^a$ when desired, and the knob 26 forms a stop which abuts against the lower edge of the frame and prevents the roller 18 from being moved so far upward as to engage the flange of the winding-roller 6.

In practice the machine is supported at a distance of seven or eight feet, or more, above the floor by suitable means, such as screws inserted through the brackets or ears 27, which are secured to the casing. The thread or cord 9 is attached to the larger end of the tapering spindle 8 and is passed over the sheave 12 and connected to the weight-holding rod 10, and the cord may then be wound upon the tapering spindle by turning the winding-drum 6 before the lesson-strip is attached. When the weight is thus wound up, as shown in Fig. 4, the winding-drum 6 is locked by inserting a pin 28 (in Fig. 2) through an opening 29 in the frame and into one of a circular series of openings 30 in the end of the winding drum or spool 6, these latter openings being arranged to register with the opening 29.

After the weight has been raised and the winding-drum 6 locked a lesson-holding drum 14 is placed in the machine and the free end of the lesson-strip is connected to the hooks 7, as shown in Fig. 4. The cover B is then placed in position, and when the pin 28 is removed the winding-drum is revolved by the weight, thus drawing the lesson-strip from the roller 14 onto the roller 6. The strip is kept taut by the retarding action of the fan, which is driven from the drum 14, and the movement of the strip is also retarded by the fan. The cover B has at its central portion a large opening 31, through which the printed characters 32 upon the lesson-strip may be seen as they pass successively upward. This opening is so proportioned to the distance between the letters or characters on the strip that but one letter or character will be visible at a time and the character will remain in view long enough for the eye to follow it without effort. As the lesson-strip accumulates on the winding-drum the diameter of the roll on the latter increases with each successive revolution and the diameter of the roll upon the lesson-holding-drum gradually decreases, and owing to this change in diameter of the strip upon the two rollers the machine would gradually slow down unless some means were provided for increasing the leverage applied to the shaft of the winding-drum. For this purpose the spindle 8 is made tapering and at the commencement of the operation the cord to which the weight is attached exerts a pull upon the smaller end of the spindle, and as the operation proceeds the pull of the cord is exerted upon the parts of the spindle of successively greater diameter, thus gradually increasing the leverage applied to the shaft of the winding-roller as the strip accumulates on the latter and maintaining the speed of the strip practically constant. In order to make the strip travel faster or slower through the entire operation of the machine, more or less weight is added to the supporting-bar 10.

After the weight has run down and the strip has been wound upon the upper or winding roller 6 a suitable key is applied to the shaft 15 of the drum 14 and the lesson-strip is wound back onto said drum, thus at the same time winding the cord upon the spindle 8 and raising the weight into position to actuate the machine again. The same lesson may be again run through the machine or the roller 14 may be removed and another roller with a lesson thereon substituted. The letters or printed characters may be arranged in any desired order upon the strip. As the machine is placed at a distance of seven or eight feet or more above the floor and the operator must watch the characters as they pass the opening in the cover or front plate and simultaneously touch the corresponding keys on the type-writer, he cannot both look at the keys and watch the lesson-strip and must, therefore, write by the touch system.

In rewinding the lesson-strip onto the lesson-holding roller the retarding action of the fan is obviated by pressing upward on the rod 24, thereby removing the friction-roller which operates the fan from the flange of the lesson-holding roller.

It is obvious that by providing lesson-strips with signs or characters indicating notes the machine may be used for instruction on musical intsruments, such as the piano. The cover of the machine may be made of glass with a clear space through which the letters may be observed, the remainder of the cover being opaque. In such case the clear space would constitute a "sight-opening" corresponding to the sight-opening 31 shown in the drawings.

Having thus described our invention, what we claim, and desire to secure by Letters Patent of the United States, is—

1. In a machine of the class described, a casing having a cover provided with a sight-opening, a winding-roller and a lesson-holding roller arranged parallel with one another, a lesson-strip in the rear of said cover, said strip having printing characters thereon arranged at substantially equal distances apart longitudinally of the strip and having its ends connected to said rollers, a weight arranged to rotate the winding-roller, a fan arranged to be operated by the lesson-holding roller, and means for gradually increasing the power applied by said weight to the winding-roller as the weight descends.

2. In a machine of the class described, a casing having a cover provided with a sight-opening, a winding-roller and a lesson-holding roller arranged parallel with one another, a lesson-strip in the rear of said cover, said strip having printing characters thereon arranged at substantially equal distances apart longitudinally of the strip and having its ends connected to said rollers, a fan arranged to be operated by the lesson-holding roller, a tapering spindle connected to the winding-roller, a cord having one end secured to the larger end of said spindle, and a weight secured to the other end of said cord.

3. In a machine of the class described, a casing having a front or cover provided with a sight-opening, a winding-roller and a lesson-holding roller arranged parallel with one another, a lesson-strip in the rear of the cover and having its ends connected to both of said rollers, a friction-roller arranged to be driven by said lesson-holding roller, a fan operatively connected to said friction-roller, means for disengaging said friction-roller from the lesson-holding roller, and a weight arranged to operate the winding-roller.

4. In a machine of the class described, a casing having a front or cover provided with a sight-opening, a winding-roller having a shaft journaled in said casing above said opening, a weight arranged to turn said shaft, a lesson-holding roller having a shaft removably journaled in said casing below said opening, said latter shaft being formed to receive a key, a lesson-strip having printing characters thereon and having its ends connected to said roller, a friction-roller movable into and out of engagement with said lesson-holding roller, and a fan operatively connected to the friction-roller.

In testimony whereof we affix our signatures in presence of two witnesses.

CHARLES R. POWELL.
WILLIAM BEVAN.

Witnesses:
T. S. HUFTING,
GEO. M. FIELDS.